(12) United States Patent
Wang et al.

(10) Patent No.: US 12,353,806 B2
(45) Date of Patent: Jul. 8, 2025

(54) SIMULATION METHOD FOR ELECTRON TEMPERATURE EVOLUTION CAUSED BY EAST TOKAMAK RADIOFREQUENCY WAVE

(71) Applicant: DALIAN UNIVERSITY OF TECHNOLOGY, Liaoning (CN)

(72) Inventors: Zhengxiong Wang, Liaoning (CN); Tong Liu, Liaoning (CN); Feng Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 389 days.

(21) Appl. No.: 17/627,416

(22) PCT Filed: Mar. 15, 2021

(86) PCT No.: PCT/CN2021/080666
§ 371 (c)(1),
(2) Date: Mar. 3, 2023

(87) PCT Pub. No.: WO2022/193041
PCT Pub. Date: Sep. 22, 2022

(65) Prior Publication Data
US 2023/0268084 A1 Aug. 24, 2023

(51) Int. Cl.
*G06F 30/25* (2020.01)
*G06F 17/13* (2006.01)
(Continued)

(52) U.S. Cl.
CPC .............. *G06F 30/25* (2020.01); *G06F 17/13* (2013.01); *G06F 30/28* (2020.01); *G06F 2113/08* (2020.01)

(58) Field of Classification Search
CPC .......... G06F 30/25; G06F 30/28; G06F 17/13; G06F 2113/08
See application file for complete search history.

(56) References Cited

U.S. PATENT DOCUMENTS 4,065,350 A * 12/1977 Sheffield ................ G21B 1/057
376/137
4,370,296 A * 1/1983 Bussard ................... G21B 1/01
336/229
(Continued)

FOREIGN PATENT DOCUMENTS

CN 106647330 A 5/2017
CN 107278010 A * 10/2017 ............. G21B 1/052
(Continued)

OTHER PUBLICATIONS

Wei et al., "Numerical simulation and analysis of electron cyclotron resonance heating effect on EAST," Nuclear Fusion and Plasma Physics, vol. 38, No. 2, Jun. 2018, 8 pages.
(Continued)

*Primary Examiner* — Adam D Houston
(74) *Attorney, Agent, or Firm* — MUNCY, GEISSLER, OLDS & LOWE, P.C.

(57) ABSTRACT

The present invention discloses a simulation method for electron temperature evolution caused by an EAST tokamak radiofrequency wave. During the process of electron temperature evolution caused by injecting a numerically simulated radiofrequency wave into an EAST tokamak device, the forms of heating source are determined according to hardware parameters of a radiofrequency system, and then the evolution of the disturbed electron temperature in a given magnetic field configuration is calculated according to an electron transport equation in a tokamak configuration. The plasma resistivity is modified according to the evolved electron temperature, and the evolution of the magnetic field configuration is calculated by adopting the modified resistivity. The evolution of the disturbed electron temperature is calculated sequentially in such magnetic field configuration,
(Continued)

and the calculation is conducted repeatedly, to achieve the simulation of long-time evolution.

1 Claim, 3 Drawing Sheets

(51) Int. Cl.
  *G06F 30/28* (2020.01)
  *G06F 113/08* (2020.01)

(56) References Cited

U.S. PATENT DOCUMENTS

| | | | | |
|---|---|---|---|---|
| 5,174,945 | A * | 12/1992 | Bussard | H05H 1/12 376/131 |
| 6,261,648 | B1 * | 7/2001 | Akiba | C23C 16/08 376/136 |
| 12,009,112 | B2 * | 6/2024 | Ford | G21B 1/17 |
| 2019/0295733 | A1 * | 9/2019 | Pais | G21B 1/21 |
| 2020/0065442 | A1 * | 2/2020 | Kim | G06F 30/25 |
| 2023/0268084 | A1 * | 8/2023 | Wang | G06F 30/10 376/121 |
| 2024/0021326 | A1 * | 1/2024 | Brandenburg | G21B 1/05 |
| 2024/0062920 | A1 * | 2/2024 | Prater | G21B 1/21 |
| 2024/0242851 | A1 * | 7/2024 | Davis | G21B 1/057 |
| 2024/0290505 | A1 * | 8/2024 | Song | G21B 1/13 |

FOREIGN PATENT DOCUMENTS

| | | | | |
|---|---|---|---|---|
| CN | 108733946 | A | | 11/2018 |
| CN | 110232205 | A | | 9/2019 |
| CN | 111222278 | A | | 6/2020 |
| CN | 111259599 | A | | 6/2020 |
| CN | 112966453 | A * | 6/2021 | ............ G06F 17/13 |
| CN | 113056079 | A * | 6/2021 | |
| CN | 113539525 | A * | 10/2021 | |
| CN | 114582527 | A * | 6/2022 | |
| CN | 114896854 | A * | 8/2022 | ............ G06F 30/25 |
| CN | 111222278 | B * | 10/2022 | ............ G21B 1/057 |
| CN | 115691836 | A * | 2/2023 | |
| CN | 116895388 | A * | 10/2023 | |
| CN | 113139292 | B * | 4/2024 | ............ G06F 30/20 |
| CN | 118762855 | A * | 10/2024 | |
| ES | 3008998 | A1 * | 3/2025 | |
| JP | S63268205 | A * | 11/1988 | |
| WO | WO-2022193041 | A1 * | 9/2022 | ............ G06F 17/13 |

OTHER PUBLICATIONS

Hou et al., "The Research of Plasma Temperature Evolution by Neutral Beam Injection Heating," Journal of University of South China( Science and Technology), vol. 26 No. 3, Sep. 2012, 4 pages.
Du et al., "Modelling of edge plasma transport during H-mode of EAST by SOLPS5.0," Acta Phys. Sin. vol. 62, No. 24 (2013) 10 pages.

* cited by examiner

SIMULATION METHOD FOR ELECTRON TEMPERATURE EVOLUTION CAUSED BY EAST TOKAMAK RADIOFREQUENCY WAVE

TECHNICAL FIELD

The present invention relates to numerical simulation of the discharge of a tokamak device in the field of magnetically controlled fusion, and particularly relates to a simulation method for electron temperature evolution caused by an EAST tokamak radiofrequency wave.

BACKGROUND

An energy problem is a thorny problem that all mankind are faced with at present. At the present stage, the energy that people use is mainly fossil fuel energy. The fossil fuel energy has limited energy reserves and can produce large amounts of harmful gases during combustion, thereby causing a serious environmental pollution problem. In order to fundamentally solve the energy problem, at present, a method generally accepted by the scientific community is controlled fusion. In order to realize the controlled fusion, many solutions are proposed, and the most promising experimental device is a tokamak device in a magnetic confinement method. Chinese scientists are also actively involved in tokamak research. At present, EAST is a full superconducting tokamak device in Hefei, Anhui province of China, and each operating parameter is at the forefront of the world. In order to realize stable operation of the EAST tokamak device, the magnetohydrodynamic (MHD) instability in the tokamak configuration must be controlled. The core plasmas can be heated in a manner of radiofrequency wave injection, and the plasma resistivity is reduced, so that the resistive magnetohydrodynamic (MHD) instability can be suppressed.

In an EAST tokamak discharge experiment, a soft X-ray diagnostic equipment is needed to detect the space distribution of the disturbed electron temperature when the radiofrequency wave is injected, thereby preferably controlling the magnetohydrodynamic (MHD) instability. But, the time and space accuracy of the electron temperature distribution measured by this method is limited, and especially the time accuracy is not high enough to meet the demand of real-time measurement. Therefore, numerical simulation is needed to assist processing, to calculate the three-dimensional space distribution of the disturbed electron temperature at any moment. At the same time, the magnetic field configuration in an experiment is evolved with time, and the evolution of an electron temperature profile is closely related to the magnetic field configuration. Therefore, a simulation method for achieving the self-consistently nonlinear evolution of the disturbed electron temperature caused by the injection of the radiofrequency wave in a real three-dimensional magnetic field configuration with time is urgently needed. A method proposed in the present invention can just meet this demand, can accurately describe the three-dimensional space distribution situations of the electron temperature profile at any moment in higher time accuracy, and has high calculation efficiency and strong numerical stability, which is an accurate and efficient numerical simulation method.

SUMMARY

The purpose of the present invention is to make up the shortage of low time accuracy when a three-dimensional space distribution of disturbed electron temperature caused by a radiofrequency wave is measured experimentally, and realize nonlinear evolution of the simulated electron temperature in a real three-dimensional magnetic field configuration of an EAST tokamak, which can obtain distribution situations of the disturbed electron temperature at any moment in three-dimensional space with higher time accuracy.

The technical solution of the present invention is as follows:

a simulation method for electron temperature evolution caused by an EAST tokamak radiofrequency wave realizes self-consistently nonlinear evolution of an electron temperature profile in a real magnetic field configuration of an EAST. The space distribution situations of the disturbed electron temperature can be described in a manner of higher time accuracy, the calculation efficiency is high, and the numerical stability is strong. The method specifically comprises the following steps:

step 1: according to geometrical configuration of an EAST tokamak device, meshing a core high-temperature plasma area in a discharge experiment, and storing physical quantity generated in the process of numerical simulation through nodes obtained by meshing;

step 2: according to a radiofrequency system adopted by the EAST tokamak device, describing a heating source $S_{ec}$ of the radiofrequency wave by adopting a gaussian function, specifically:

$$S_{ec} = S_0 \exp\left\{2 - \left[\left(\frac{R-R_0}{\Delta R_d}\right)^2 + \left(\frac{Z-Z_0}{\Delta Z_d}\right)^2 + \left(\frac{\varsigma-\varsigma_0}{\Delta\varsigma_d}\right)^2\right]\right\}$$

where, R is a horizontal coordinate, Z is a vertical coordinate, $\xi$ is a circumferential coordinate, $S_0$ is a heating source amplitude which can be calculated according to transmitting power of a radiofrequency system, $R_0$, $Z_0$ and $\varsigma_0$ are respectively positions in a horizontal direction, a vertical direction and a circumferential direction of a radiofrequency wave action area, and $\Delta R_d$, $\Delta Z_d$ and $\Delta\xi_d$ are respectively action widths in the horizontal direction, the vertical direction and the circumferential direction.

The parameters related to the heating source are initialized according to experimental parameters such as physical size of a radiofrequency system antenna, the transmitting power of the radiofrequency system, etc., comprising a space distribution function, a strength amplitude and a heating area of the heating source. The basic parameters such as transport coefficients in an electron heat transport equation and spitzer resistivity coefficients in a spitzer resistivity equation in a tokamak configuration are initialized according to experimental discharge parameters. At the same time, the initial disturbed electron temperature $\delta T_e^{(0)}$ is obtained;

step 3: measuring the initial magnetic field configuration, (i.e. distribution information on a magnetic flux function in three-dimensional space) by adopting a diagnostic device such as a magnetic probe and a magnetic flux ring on the EAST tokamak device, and converting the measured magnetic flux function into a grid divided in step 1 through a cubic spline interpolation method, thereby obtaining the initial magnetic flux function $\psi^{(0)}$ and storing into a mesh node;

step 4: calculating the evolution with time of the disturbed electron temperature in the current magnetic field configuration according to the electron heat transport equation in the tokamak configuration, and obtaining the disturbed electron temperature $\delta T^{(1)}$ at the next moment, wherein the solved heat transport equation here is:

$$\frac{\partial T_e}{\partial t} = -v \cdot \nabla T_e + \nabla \cdot (\kappa_{//} \nabla_{//} T_e) + \nabla \cdot (\kappa_\perp \nabla_\perp T_e) + S_{ec}$$

where, $T_e$ is electron temperature and $T = T_{e0} + \delta T_e$, $T_{e0}$ and $\delta T_e$ are respectively equilibrium electron temperature and disturbed electron temperature, t is time, v is magnetohydrodynamic velocity, $\kappa_{//}$ and $\kappa_\perp$ are respectively transport coefficients of the electrons in parallel and vertical magnetic field line directions, the subscripts of // and $\perp$ indicates parallel direction and vertical direction respectively, and $S_{ec}$ indicates the heating source.

step 5: according to the current electron temperature obtained by calculating the electron heat transport equation in step 4, calculating current plasma resistivity $\eta^{(1)}$ according to a spitzer resistivity equation, wherein the solved spitzer resistivity equation is:

$\eta = \kappa_S T_e^{-3/2}$ where, $\eta$ is plasma resistivity, and $\kappa_S$ is a spitzer resistivity coefficient.

step 6: substituting the plasma resistivity obtained in step 5 into a magnetic flux equation, calculating the magnetic flux at the next moment and obtaining the magnetic flux $\psi^{(1)}$ after nonlinear evolution, wherein the solved magnetic flux evolution equation here is:

$$\frac{\partial \psi}{\partial t} = \nabla \psi \times \nabla \phi - \eta(j - j_{bs})$$

where, $\psi$ is magnetic flux, $\phi$ is potential, $\eta$ is plasma resistivity, j is total current of the plasmas, and $j_{bs}$ is bootstrap current;

step 7: outputting the three-dimensional space distribution information on the disturbed electron temperature $\delta T_e$ into a file to store; and step 8: calculating the current magnetic field configuration according to the magnetic flux obtained in step 6, and repeating steps 4-8, thereby obtaining the three-dimensional space distribution $\delta T_e^{(n)}$ of the disturbed electron temperature at any moment.

The present inventions has beneficial effects that: the present invention realizes the nonlinear evolution of the electron temperature profile in a real three-dimensional magnetic field configuration of the EAST tokamak after the injection of a numerically simulated radiofrequency wave, and can obtain distribution situations of the disturbed electron temperature at any moment in three-dimensional space, thereby making up the shortage of low time accuracy in measuring experimentally and having high calculation efficiency and strong numerical stability, which is a stable and efficient numerical simulation method.

DETAILED DESCRIPTION

Specific embodiments of the present invention are further described below in combination with accompanying drawings and the technical solution.

Figure 1:
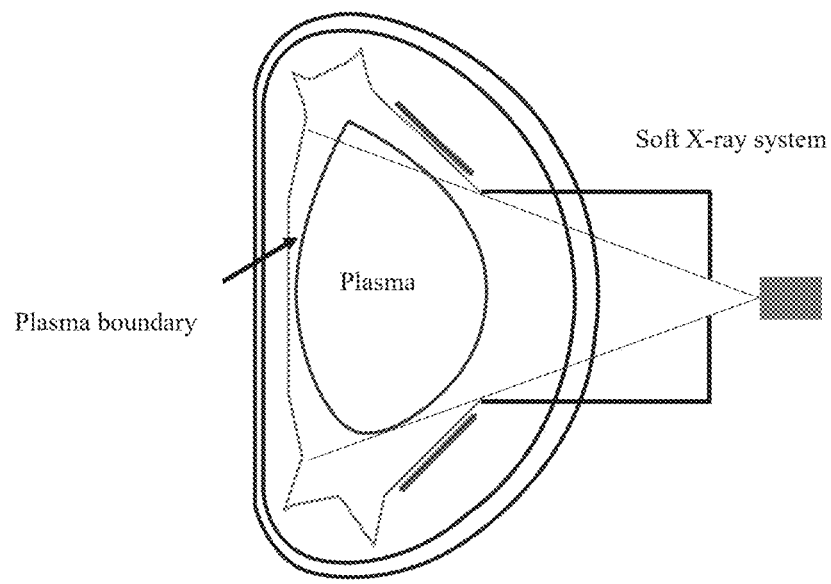
FIG. 1 is a cross section schematic diagram of an EAST tokamak device applicable to the present invention.
Figure 2:
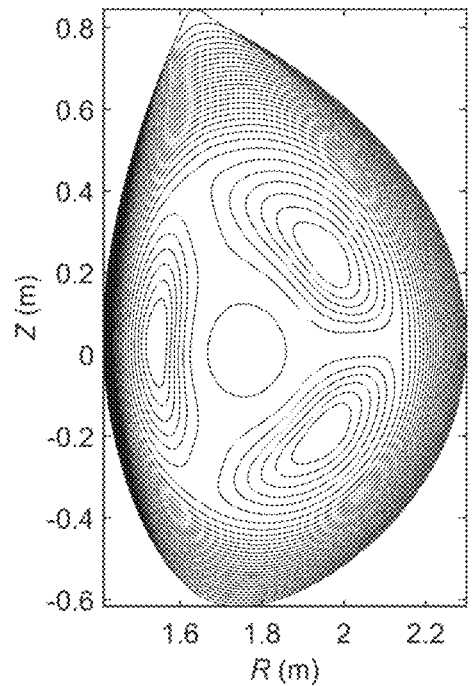
FIG. 2 is a section diagram of an initial magnetic field configuration used for numerical simulation of the present invention.

An EAST tokamak device has a section configuration as shown in FIG. 1, wherein a core position is an area containing plasmas in an experimental discharge process. The EAST tokamak is equipped with a soft X-ray system for measuring space distribution of the disturbed electron temperature. First, a core plasma area is meshed according to an EAST geometry configuration shown in FIG. 1. In an EAST tokamak discharge experiment, magnetic island suppression is one of the main functions of radiofrequency wave heating, so the initial magnetic field configuration generally includes a magnetic island structure, as shown in FIG. 2, and the reconnection of magnetic field lines forms a magnetic island chain structure consisting of three magnetic islands in a poloidal period. An injection position of the radiofrequency wave is generally a center of a magnetic island. The self-consistently nonlinear evolution can be conducted on the disturbed electron temperature caused by the injection of the radiofrequency wave in a given magnetic field configuration, finally achieving stable distribution in the space. The embodiment describes a heating source of the radiofrequency wave by adopting a gaussian function. In an EAST experiment, an electron cyclotron wave emission system is usually adopted to generate the radiofrequency wave, and the gaussian function can describe the heating source better. Then, the heating source is initialized, and the information on the initial magnetic field and the space distribution information on the initial electron temperature is stored in the grid nodes. The nonlinear evolution of the disturbed electron temperature along the specific magnetic field line is calculated according to an electron heat transport equation in the tokamak configuration. The present plasmas resistivity is calculated through a spitzer resistivity equation according to the current electron temperature. The calculated plasma resistivity is substituted into a magnetic flux evolution equation to calculate a modified result of the previous magnetic field after the injection of the radiofrequency wave, and the modified magnetic field is obtained. Finally, the modified magnetic field is used as the current magnetic field configuration and then the nonlinear evolution of the disturbed electron temperature is calculated, and the previous steps are repeated several times, so a stable distribution of the three-dimensional space of the electron temperature at any moment with high time accuracy can be obtained, as shown in FIG. 3, which shows a section diagram of the space distribution of the disturbed electron temperature at two of the moments.

Specific implementation steps are as follows:

step 1: according to geometrical configuration of an EAST tokamak device, meshing a core high-temperature plasma area in a discharge experiment, and storing physical quantity generated in the process of numerical simulation through nodes obtained by meshing;

step 2: according to a radiofrequency system adopted by the EAST tokamak device, describing a heating source $S_{ec}$ of a radiofrequency wave by adopting a gaussian function, specifically:

$$S_{ec} = S_0 \exp\left\{2 - \left[\left(\frac{R-R_0}{\Delta R_d}\right)^2 + \left(\frac{Z-Z_0}{\Delta Z_d}\right)^2 + \left(\frac{\varsigma-\varsigma_0}{\Delta\varsigma_d}\right)^2\right]\right\}$$

where, R is a horizontal coordinate, Z is a vertical coordinate, S is a circumferential coordinate, $S_0$ is a heating source amplitude which can be calculated according to transmitting power of a radiofrequency system, $R_0$, $Z_0$ and $\xi_0$ are respectively positions in a horizontal direction, a vertical direction and a circumferential direction of a radiofrequency wave action area, and $\Delta R_d$, $\Delta Z_d$ and $\Delta\xi_d$ are respectively action widths in the horizontal direction, the vertical direction and the circumferential direction.

The parameters related to the heating source are initialized according to experimental parameters such as physical size of a radiofrequency system antenna, the transmitting power of the radiofrequency system, etc., comprising a space distribution function, a strength amplitude and a heating area of the heating source. The basic parameters such as transport coefficients in an electron heat transport equation and spitzer resistivity coefficients in a spitzer resistivity equation in a tokamak configuration are initialized according to experimental discharge parameters. The specific parameters adopted in an embodiment are as follows:

$S_0=1.5$ MW, $R_0=1.9$ m, $Z_0=0.3$ m, $\xi_0=0$, $\Delta R_d=0.1$ m, $\Delta Z_d=0.1$ m and $$\Delta\varsigma_d = \frac{\pi}{3}\text{rad}.$$

In this embodiment, the radiofrequency system is turned on at the initial moment, so the disturbed electron temperature $\delta T_{e(0)}$ caused by the radiofrequency system at the initial moment is zero;

step 3: measuring the initial magnetic field configuration, (i.e. distribution information on a magnetic flux function in three-dimensional space) by adopting a diagnostic device such as a magnetic probe and a magnetic flux ring on the EAST tokamak device, and converting the measured magnetic flux function into a grid divided in step 1 through a cubic spline interpolation method, thereby obtaining the initial magnetic flux function $\psi^{(0)}$ and storing into a mesh node, wherein a contour map of the magnetic flux function $\psi^{(0)}$ is shown in FIG. 2;

step 4: calculating the evolution with time of the disturbed electron temperature in the current magnetic field configuration according to the electron heat transport equation in the tokamak configuration, and obtaining the disturbed electron temperature $\delta T_e^{(1)}$ at the next moment, wherein the solved heat transport equation here is:

$$\frac{\partial T_e}{\partial t} = -v\cdot\nabla T_e + \nabla\cdot(\kappa_{//}\nabla_{//} T_e) + \nabla\cdot(\kappa_\perp\nabla_\perp T_e) + S_{ec}$$

where, $T_e$ is electron temperature and $T_e=T_{e0}+\delta T_e$, $T_{e0}$ and $\delta T_e$ are respectively equilibrium electron temperature and disturbed electron temperature, t is time, v is magnetohydrodynamic velocity, $\kappa_{//}$ and $\kappa_\perp$ are respectively transport coefficients of the electrons in parallel and vertical magnetic field line directions, the subscripts of // and $\perp$ indicates parallel direction and vertical direction respectively, and $S_{ec}$ indicates the heating source.

The specific parameters adopted in an embodiment are as follows:

v □400 m/s, $\kappa_{//}=1.6\times10^6$ m²/s and $\kappa_\perp=1.6\times10^{-3}$ m²/s, $S_{ec}$ can be obtained by calculating the data in step 2.

step 5: according to the current electron temperature obtained by calculating the electron heat transport equation in step 4, calculating current plasma resistivity $\eta^{(1)}$ according to a spitzer resistivity equation, wherein the solved spitzer resistivity equation is:

$$\eta = \kappa_S T_e^{3/2}$$

where, $\eta$ is plasma resistivity, and $\kappa_S=1.0$ is a spitzer resistivity coefficient.

step 6: substituting the plasma resistivity obtained in step 5 into a magnetic flux equation, calculating the magnetic flux at the next moment and obtaining the magnetic flux $\psi^{(1)}$ after nonlinear evolution, wherein the solved magnetic flux evolution equation here is:

$$\frac{\partial\psi}{\partial t} = \nabla\psi\times\nabla\phi - \eta(j-j_{bs})$$

where, $\psi$ is magnetic flux, $\phi$ is potential, which is measured through a Langmuir probe, $\eta$ is plasma resistivity, j is total current of the plasmas, and $j_{bs}$ is bootstrap current, and a current profile can be obtained through balanced profile inversion.

step 7: outputting the three-dimensional space distribution information on the disturbed electron temperature $\delta T_e$ into a file to store; and step 8: calculating the current magnetic field configuration according to the magnetic flux obtained in step 6, and repeating steps 4-8, thereby obtaining the three-dimensional space distribution $\delta T_e^{(n)}$ of the disturbed electron temperature at any moment.

Figures 3A, 3B:
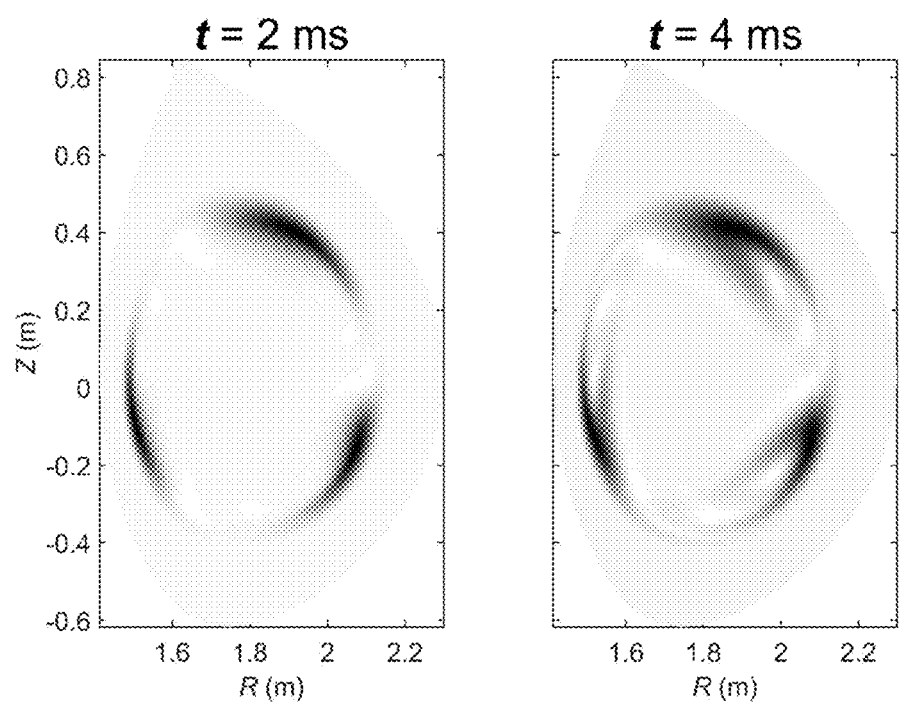
FIG. 3(a) is a section diagram of simulation results of the evolution of disturbed electron temperature at 2 ms moment after the injection of a radiofrequency wave in an EAST tokamak device applied to the present invention.
FIG. 3(b) is a section diagram of simulation results of the evolution of disturbed electron temperature at 4 ms moment after the injection of a radiofrequency wave in an EAST tokamak device applied to the present invention.
Figure 4:
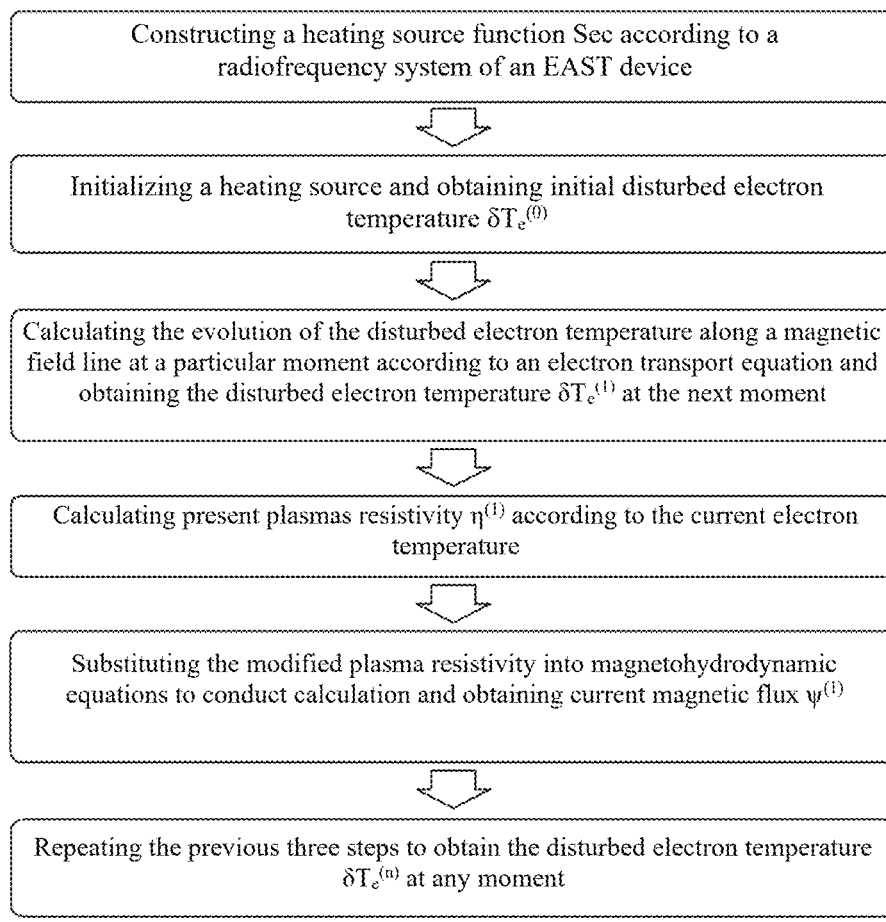
FIG. 4 is a main flow chart of the evolution of disturbed electron temperature used for numerical simulation in the present invention.

In this embodiment, $dt=1\times10^{-9}$ s time step is adopted for simulation (that is, for each round of steps 4-8, the simulation takes $1\times10^{-9}$ s ), after $2\times10^6$ rounds of simulation, the space distribution situations of the disturbed electron temperature at t=2 ms moment can be obtained, as shown in FIG. 3(a), and after $2\times10^6$ rounds of simulation, the space distribution situations of the disturbed electron temperature at t=4 ms moment can be obtained, as shown in FIG. 3(b).

The above contents are further detailed descriptions of the present invention in combination with preferred embodiments. However, the specific implementation of the present invention shall not be considered to be only limited to these descriptions. For those ordinary skilled in the art to which the present invention belongs, several simple deductions and replacements may be made without departing from the conception of the present invention, all of which shall be considered to belong to the protection scope of the present invention.

The invention claimed is:

1. A simulation method for electron temperature evolution caused by an EAST tokamak radiofrequency wave, which realizes self-consistently nonlinear evolution of an electron temperature profile after injection of a radiofrequency wave in a real three-dimensional magnetic field configuration of an EAST tokamak, to obtain the electron temperature profile at any moment and provide space distribution situations of the electron temperature; comprising the following steps:

step 1: according to geometrical configuration of an EAST tokamak device, meshing a core high-temperature plasma area in a discharge experiment, and storing physical quantity generated in the process of numerical simulation through nodes obtained by meshing;

step 2: according to a radiofrequency system adopted by the EAST tokamak device, describing a heating source $S_{ec}$ of a radiofrequency wave by adopting a gaussian function, specifically:

$$S_{ec} = S_0 \exp\left\{2 - \left[\left(\frac{R-R_0}{\Delta R_d}\right)^2 + \left(\frac{Z-Z_0}{\Delta Z_d}\right)^2 + \left(\frac{\varsigma-\varsigma_0}{\Delta\varsigma_d}\right)^2\right]\right\}$$

where, R is a horizontal coordinate; z is a vertical coordinate; $\xi$ is circumferential coordinate; $S_0$ is an amplitude of heating source calculated according to transmitting power of the radiofrequency system; $R_0$, $Z_0$ and $\xi_0$ are respectively positions in a horizontal direction, a vertical direction and a circumferential direction of a radiofrequency wave action area, and $\Delta R_d$, $\Delta Z_d$ and $\Delta\xi_d$ are respectively action widths in the horizontal direction, the vertical direction and the circumferential direction;

initializing parameters related to the heating source according to physical size of a radiofrequency system antenna and the transmitting power of the radiofrequency system, comprising a space distribution function, a strength amplitude and a heating area of the heating source; initializing transport coefficients in an electron heat transport equation and spitzer resistivity coefficients in a spitzer resistivity equation in a tokamak configuration according to experimental discharge parameters; and at the same time, obtaining the initial disturbed electron temperature or $\delta T_e^{(0)}$;

Step 3: measuring the initial magnetic field configuration, i.e. distribution information on a magnetic flux function in three-dimensional space by adopting a magnetic probe and a magnetic flux ring on the EAST tokamak device, and converting the measured magnetic flux function into a grid divided in step 1 through a cubic spline interpolation method, thereby obtaining the initial magnetic flux function $\psi^{(0)}$ and storing into a mesh node;

step 4: calculating the evolution with time of the disturbed electron temperature along the current magnetic field configuration according to the electron heat transport equation in the tokamak configuration, and obtaining the disturbed electron temperature $\delta T_e^{(1)}$ at the next moment;

wherein the solved heat transport equation is:

$$\frac{\partial T_e}{\partial t} = -v \cdot \nabla T_e + \nabla \cdot (\kappa_{//}\nabla_{//} T_e) + \nabla \cdot (\kappa_{\perp}\nabla_{\perp} T_e) + S_{ec}$$

where, $T_e$ is electron temperature and $T_e=T_{e0}+\delta T_e$, $T_{e0}$ and $\delta T_e$ are respectively equilibrium electron temperature and disturbed electron temperature, t is time, v is magnetohydrodynamic velocity, $\kappa_{//}$ and $\kappa_{\perp}$ are respectively transport coefficients of the electrons in parallel and vertical magnetic field line directions, the subscripts of // and $\perp$ indicates parallel direction and vertical direction respectively, and $s_{ec}$ indicates the heating source;

step 5: according to the current electron temperature obtained by calculating the electron heat transport equation in step 4, calculating current plasma resistivity $\eta^{(1)}$ according to a spitzer resistivity equation;

wherein the solved spitzer resistivity equation is:

$$\eta = \kappa_S T_e^{3/2}$$

where, $\eta$ is plasma resistivity, and $\kappa_S$ is a spitzer resistivity coefficient;

step 6: substituting the plasma resistivity obtained in step 5 into a magnetic flux evolution equation, calculating the magnetic flux at the next moment and obtaining the magnetic flux $\psi^{(1)}$ after nonlinear evolution;

wherein the solved magnetic flux evolution equation is:

$$\frac{\partial \psi}{\partial t} = \nabla\psi \times \nabla\phi - \eta(j - j_{bs})$$

where, $\psi$ is magnetic flux, $\phi$ is potential, $\eta$ is plasma resistivity, j is total current of the plasmas, and $j_{bs}$ is bootstrap current;

step 7: outputting the three-dimensional space distribution information on the disturbed electron temperature $\delta T_e$ into a computer to store; and step 8: calculating the current magnetic field configuration according to the magnetic flux obtained in step 6, and repeating steps 4-8, thereby obtaining the three-dimensional space distribution $\delta T_e^{(n)}$ of the disturbed electron temperature at any moment.

* * * * *